United States Patent
Diab et al.

(10) Patent No.: US 9,001,843 B2
(45) Date of Patent: Apr. 7, 2015

(54) FAST WAKE-UP AND LINK ACQUISITION IN REDUCED-TWISTED PAIR GIGABIT ETHERNET APPLICATIONS

(71) Applicant: Broadcom Corporation, Irvine, CA (US)

(72) Inventors: Wael William Diab, San Francisco, CA (US); Mehmet V. Tazebay, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 236 days.

(21) Appl. No.: 13/674,603

(22) Filed: Nov. 12, 2012

(65) Prior Publication Data

US 2014/0119381 A1    May 1, 2014

Related U.S. Application Data

(60) Provisional application No. 61/720,279, filed on Oct. 30, 2012.

(51) Int. Cl.
| | |
|---|---|
| *H04L 12/28* | (2006.01) |
| *H04W 4/00* | (2009.01) |
| *H04B 3/46* | (2006.01) |
| *H04B 17/00* | (2006.01) |
| *H04L 12/40* | (2006.01) |

(52) U.S. Cl.
CPC ....... *H04L 12/40* (2013.01); *H04L 2012/40273* (2013.01)

(58) Field of Classification Search
CPC ..... H04W 80/04; H04W 88/06; H04W 28/04; H04W 72/04; H04L 29/06; H04L 12/2801; H04L 1/20; H04L 1/24

USPC ............................ 370/328, 329, 431; 375/224
See application file for complete search history.

(56) References Cited

U.S. PATENT DOCUMENTS

| 6,078,586 A * | 6/2000 | Dugan et al. ............... 370/395.2 |
| 2004/0131028 A1 * | 7/2004 | Schiff et al. ................. 370/329 |

(Continued)

OTHER PUBLICATIONS

Barrass, Hugh et al., "Energy Efficient Ethernet", IEEE Tutorial, Jul. 16, 2007, US, 72 pages, available on-line at http://www.ieee802.org/802tutorials/07-July/IEEE-tutorial-energy-efficient-ethernet.pdf.

(Continued)

*Primary Examiner* — Ronald Abelson
(74) *Attorney, Agent, or Firm* — Garlick & Markison; Edward J. Marshall

(57) ABSTRACT

Automotive area networks (AAN) have a substantially fixed network topology, meaning that the physical media used for communications between devices included in the AAN is known. For example, the physical connections within an AAN, sometimes provided by wiring harnesses, can include fixed lengths of twisted pairs of wire ("twisted pairs"). Pre-compensation parameters related to characteristics of the twisted pairs can be determined at the factory, and loaded into the memory of devices connected to the AAN. These pre-compensation parameters are used to improve the fast wake up and link acquisition times of connected devices. Various characteristics of the physical communication channel are measured or estimated as a function of mechanical, ingress, climactic, and environmental variations (MICE), and used to update the pre-compensation parameters.

20 Claims, 6 Drawing Sheets

(56) References Cited

U.S. PATENT DOCUMENTS

2010/0240383 A1* 9/2010 Ankel et al. ............... 455/452.1
2010/0284382 A1* 11/2010 Stahlin et al. .................. 370/338
2011/0206105 A1* 8/2011 Lin et al. ....................... 375/224

OTHER PUBLICATIONS

N-TRON, "Ethernet Auto-Negotiation", US, 6 pages, available online at http://n-tron.com/pdf/ethernet_autonegotiation.pdf.

* cited by examiner

FAST WAKE-UP AND LINK ACQUISITION IN REDUCED-TWISTED PAIR GIGABIT ETHERNET APPLICATIONS

CROSS REFERENCE TO RELATED PATENTS/PATENT APPLICATIONS

This application claims the benefit of U.S. Provisional Application No. 61/720,279 filed Oct. 30, 2012 and entitled "FAST WAKE-UP AND LINK ACQUISITION IN REDUCED-TWISTED PAIR GIGABIT ETHERNET APPLICATIONS,", which is incorporated herein in its entirety by reference for all purposes.

BACKGROUND

1. Field

This invention relates generally to fast wake-up and link acquisition, and more particularly to fast wake-up and link acquisition in reduced-twisted pair gigabit Ethernet applications.

2. Related Art

Automotive Area Networks (AANs) allow interconnection of multiple devices via a network implemented in an automobile. AANs are similar to more traditional local area networks (LANs), but often have more stringent startup time requirements for networked devices. Many AANs are currently implemented using controller area network (CAN) buses, which are considerably slower than LANs implementing any of the various forms of Ethernet, especially LANs implementing Gigabit Ethernet. Gigabit Ethernet traditionally requires four twisted wire pairs ("twisted pairs"), which would make automotive wiring harnesses prohibitively heavy. Thus, the IEEE has established the 802.3 Reduced Twisted Pair Gigabit Ethernet PHY study group to study using fewer than four twisted pairs to implement Gigabit Ethernet in AANs.

Gigabit Ethernet applications require the use of auto-negotiation between PHY devices to establish communication between two devices. During the auto-negotiation process the devices attempting to communicate with each other via the AAN will each send each other information about their capabilities so that a proper communication mode can be established. During the auto-negotiation process, the PHY of one device is selected as the master, and the PHY of the other device is selected as the slave.

After exiting auto-negotiation, the PHY enters a training mode. Training begins with the SLAVE silent and the MASTER at a reduced transmit power until it receives a response from the slave. PHY training is coordinated by exchanges of information using 2-level pulse amplitude modulation (PAM) signaling in "Info fields," which are used to convey state transitions, transmit power settings, transition synchronization information, receiver status, such as signal to noise ratio (SNR), and to exchange precoder coefficients. Additionally, the link integrity can be tested at the PHY level.

Because of the relatively large amount of information that must be passed back and forth as part of the link acquisition process, current technology can require a link acquisition time that is prohibitively long in the context of AANs.

DETAILED DESCRIPTION

As used herein, the following terms are to be given their ordinary meaning, unless otherwise specified or apparent from the context in which the terms are used. The term "Automotive Area Network" ("AAN"), refers generally to a network such as those found in various automobiles, but can also refer to networks in vehicles other than automobiles, for example a motorcycle, a bus, an airplane, a boat or ship, or the like. AANs have a substantially fixed network topology; the arrangement of devices in an AAN does not normally change over time. Even if devices are replaced, replacement devices are usually coupled to the AAN over the same physical pathway.

The terms "compensation parameter," "pre-compensation parameter," and similar terms are used herein generally to refer to channel/link parameters used by a PHY or similar device to adjust transceiver variables to account for channel/link conditions or parameters. Thus, pre-compensation parameters can include threshold values indicating maximum or minimum parameter values, offset values used to adjust a base parameter, range values indicating an acceptable and/or unacceptable range of values, "set-to" values indicating particular values to assign values used in computations related to link wake-up and acquisition, actual/estimated channel/link performance values, or some combination of these. The terms "channel conditions," "link conditions," "channel parameters," and "link parameters" include, but are not limited to, insertion loss, return loss, source clock offset, and crosstalk values measured or estimated as a function of mechanical, ingress, climactic, and environmental ("MICE") variations. The term "channel response settings" refer generally to variables that are set according to pre-compensation parameters to satisfy a specified channel performance characteristic.

The terms "operating environment," "environment," and other similar terms, are used to refer to the general situations, conditions, and other factors that may affect a vehicle or AAN carried by a vehicle, and which can be detected or determined by any of various sensors and subsystems included in an AAN, or about which information can be provided by a driver or passenger. An operating environment can include channel and link conditions.

Figure 1:
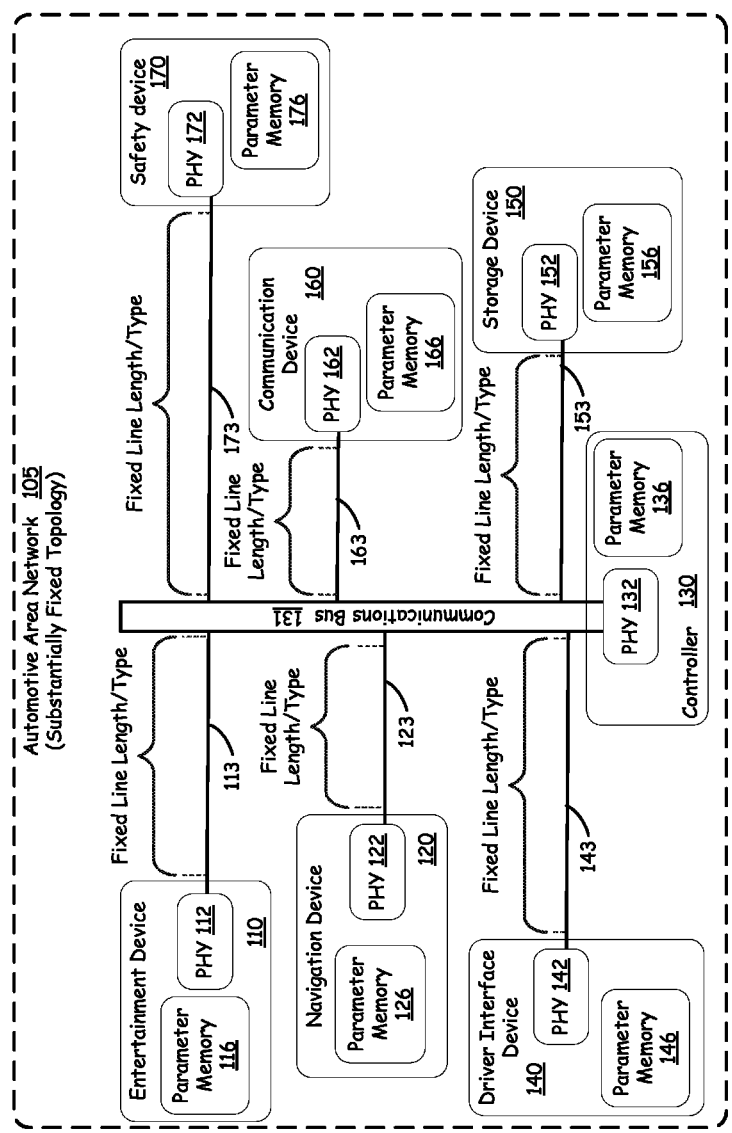
FIG. 1 is a block diagram illustrating an Automotive Area Network (AAN) having a substantially fixed topology and including multiple networked devices capable of fast wake-up and link acquisition according to various embodiments of the disclosure.

Referring first to FIG. 1, an automotive area network (AAN) 105 having a substantially fixed topology is illustrated and discussed according to various embodiments. In at least one embodiment, AAN 105 is implemented with Gigabit Ethernet protocols over reduced twisted-pair physical paths, and uses stored pre-compensation parameters to reduce wake up and link acquisition times. For a given PAM-4 modulation system over a CAT6A channel response, there can be significant time savings up for wake-up and link acquisition compared to a 802.3ab 1000BASE-T PHY start-up time.

AAN 105 includes entertainment device 110, navigation device 120, driver interface device 140, safety device 170, a communication device 160, storage device 150, and controller 130. Controller 130 connects to communications bus 131, which in turn connects to each of the endpoint devices via physical media having a fixed line length and type. Although each of the physical connections to the particular devices from controller 130 is fixed, the physical connections may be different from each other in many embodiments. For example, communications path 113 may have a different length than communication paths 123, 143, 153, 163, and 173. However, none of the individual communication paths will change in length or composition over time. For example, communications bus 131, and each of the communications paths 113, 123, 143, 153, 163, and 173, can be included as part of an automotive wiring harness that uses twisted pair conductors to form communication paths.

In various embodiments, each of the devices includes a PHY module 112, 122, 142, 152, 162, and 172, respectively. These PHY modules can be used to communicate with PHY module 132 included in controller 130. Although PHY 132 is shown as being coupled to communications bus 131, other network configurations can be employed. For example, various gateways, routers, and other devices can be used to implement AAN 105, such that each of the devices is connected either directly to each other, to controller 130 through a gateway or router, to a subsystem controller which is in turn connected to communications bus 131 through a fixed line length/type communication path.

Each of the devices in automotive area network 105 also includes a parameter memory. For example entertainment device 110 includes parameter memory 116; navigation device 120 includes parameter memory 126; driver interface device 140 includes parameter memory 146; controller 130 includes parameter memory 136; storage device 150 includes parameter memory 156; communication device 160 includes parameter memory 166; and safety device 170 includes parameter memory 176. Note that in various embodiments, including a parameter memory within each of the devices connected to AAN 105 allows each particular device to store default parameters to be used upon initiation of link acquisition, upon power up of the system, or when a particular device receives a wake-up command signal from controller 130 or some other device.

In various embodiments, the parameters stored in each of the parameter memories include pre-compensation parameters. Default pre-compensation parameters can be determined during the manufacturing process, either before or after all portions of AAN 105 are installed in a vehicle. It is anticipated that determining pre-compensation parameters in advance of installation of the wiring harness and devices into a vehicle, may result in less than optimal selection of default pre-compensation parameters, but may nevertheless, be useful in a fast-paced production environment. Furthermore, default pre-compensation parameters determined for each of the communication pathways prior to installation of the devices and communications bus 131 in a vehicle, can serve as starting points when measuring or estimating pre-compensation parameters after installation in a vehicle. Thus, estimated values for channel parameters, such as crosstalk impedance and the like, may simply serve as a starting point to increase the speed of a training process performed during the manufacturing process.

The channel response parameters used to obtain the pre-compensation parameters stored in the parameter memories can include, but are not limited to, insertion loss, return loss, source clock offset, crosstalk, signal-to-noise ratios, or the like. Most, if not all, of these channel parameter can be captured, measured, estimated, or otherwise determined as a function of mechanical and temperature variations. Thus, any one or more channel parameter may vary directly or indirectly with temperature, conductor length, age, vibration, and the like. The various parameters, measurements, and estimates used to establish pre-compensation parameters can also depend on location of the physical medium within a vehicle, quality of installation, material quality, and manufacturing quality of the wiring harness, connectors, shielding, connections, and the like. Even so, many of these parameters are substantially fixed for any particular communications channel once established.

In some embodiments, the pre-compensation parameters can be used as part of an overall control policy used to set various power and performance parameters for each of the devices. In some such embodiments, controller 130 can store information related to the parameters for each specific device connected to communications bus 131, and send that information to each of the devices individually the first time a device is connected to AAN 105. In this way, controller 130 can store a complete set of default pre-compensation parameters for each communication path for each device, and provide those parameters to each device. Upon receipt, each of those devices can store the parameters in its own respective parameter memory. Thus, if an entertainment device 110 fails and is replaced by another entertainment device, controller 130 can send the parameters for entertainment device 110 to the replacement entertainment device, thereby allowing the replacement entertainment device to immediately receive the benefits of having the parameters stored in its own memory.

In various embodiments, the pre-compensation parameters stored in parameter memories of each of the individual devices, can be used to facilitate fast wake-up and link acquisition each time a device is powered on. Thus, for example, instead of performing a full link negotiation, in which various channel parameters are set based on a training sequence performed at the conclusion of an auto negotiation process, a truncated version of a training procedure can be performed. Alternatively a training portion of the link acquisition process can be completely bypassed, because the parameters that would normally be determined during the training process have previously been obtained, and stored in each of the devices. Even where default pre-compensation parameters are employed, however, the default pre-compensation parameters can be updated on a continuing, occasional, or periodic basis, based on current or historical measurements and estimates of channel response characteristics.

Figure 2:
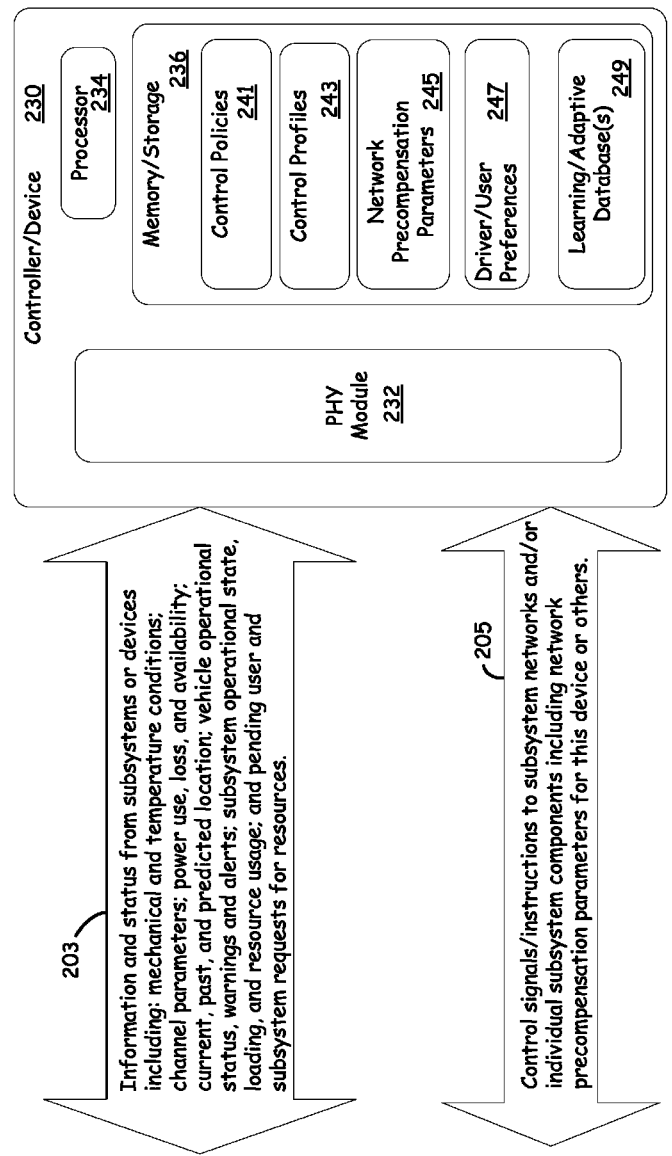
FIG. 2 is a block diagram illustrating a controller or other device connected to the AAN according to various embodiments of the present disclosure.

Referring next to FIG. 2, a controller/device 230 is illustrated, and will be discussed according to various embodiments of the disclosure. Controller/device 230 can be a controller that exercises control over other devices, including an AAN control module that controls an entire AAN, or only a subsystem controller that controls only a subsystem of the AAN. Controller/device 230 can also be an individual device, such as a network storage drive, connected to AAN. Controller/device 230 includes processor 234, memory/storage 236, and PHY module 232. Status information 203 indicating the current operating environment of AAN 105, including channel and link parameters, and current mechanical and temperature conditions, is received by controller/device 230. In some embodiments, information 203 can be obtained by another network device and forwarded to controller/device 230. Additionally or alternatively, controller/device 230 can deliver information 203 to other devices as information 205.

Processor 234 includes one or more general-purpose processors, special-purpose processors, circuitry, hardware, and/or firmware and software, to implement various embodiments disclosed herein. Generally, processor 234 works in conjunction with memory/storage 236 to select appropriate pre-compensation parameters 245, and provide those pre-compensation parameters to PHY module 232 for use in acquiring a communications link. In various embodiments, some or all of the memory/storage 236 is included as part of PHY module 232, which can itself include a hardware or firmware processing module. Processor 234 can also be used to implement control policies, stored in control policies memory 241.

Memory/storage 236 includes control policies 241, control profiles 243, network-based parameters 245, and driver/user preferences 247. Control policies 241 can include policies that govern, in conjunction with information 203 and other information stored in memory/storage 236, the power state of PHY module 232 and other portions of controller/device 230. Where multiple different groups of pre-compensation parameters are stored in memory/storage 236, control policies 241 can also specify which pre-compensation parameters 245 to use under given mechanical, ingress, climactic, and environmental (MICE) conditions. Where multiple different control policies are stored in control policies 241, control profiles 243 can be used to aid in selecting an appropriate control policy. In various embodiments, control policies 241 are implemented subject to driver/user preferences 247.

Learning/adaptive databases 249 can include one or more databases used to record and track performance and performance estimates of one or more communication channels established using PHY module 232. In various embodiments, MICE conditions contemporary to performance measurements and estimates are stored and linked to particular measurements and estimates. Learning/adaptive databases 249 can include measurements and estimates of a channel/link response made at different times and under various different operating environments. For example, information stored in learning/adaptive databases can represent information obtained periodically, occasionally, continually, or on an event-triggered basis. Information can be stored in learning/adaptive databases 249 as the measurements and estimates are obtained, they can be received from another device as information 203, or they can be downloaded directly into controller/device 230.

By analyzing the information in learning/adaptive databases 249, processor 234 can determine whether links established using particular network pre-compensation parameters are optimal. In some embodiments, link acquisition parameters are considered optimal if link acquisition time is less than a threshold level, if acquired links operate at a speed above a threshold level, if a balance between power usage and link acquisition time meets a threshold requirement, or if there is no other set of pre-compensation parameters that would be likely to provide better link acquisition time, link performance, or more closely meet a power/performance balance. In instances where a given pre-compensation parameter, or set of pre-compensation parameters, is determined to be non-optimal, processor 234 can select different pre-compensation parameters for a current or subsequent communication based on past link performance information stored in learning/adaptive databases 249. In some instances, one or more default pre-compensation parameters can be adjusted or replaced to achieve more desirable performance characteristics, even if the maximum achievable performance is determined to be less than optimal.

Figure 3:
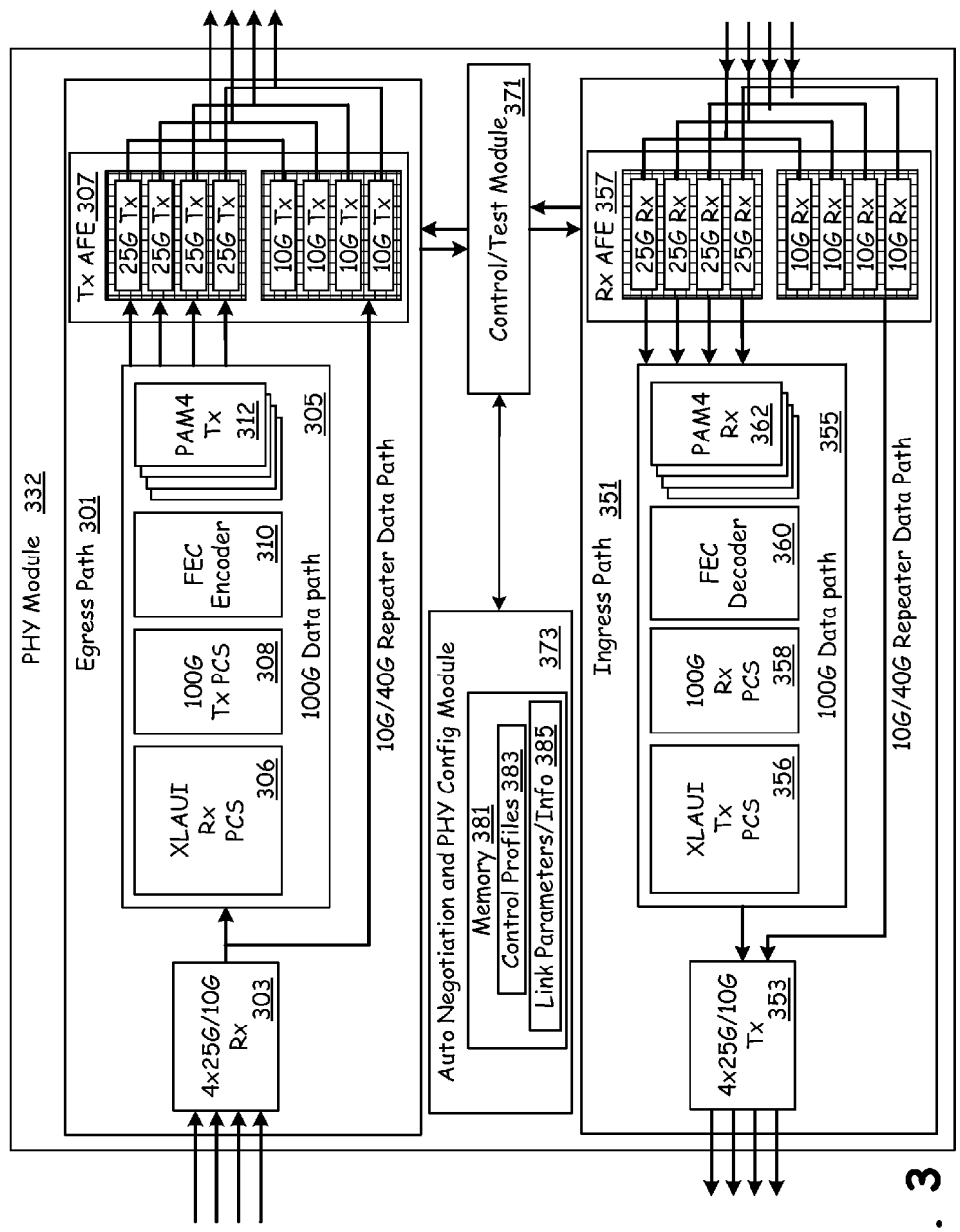
FIG. 3 is a block diagram illustrating a PHY interface module that provides a physical interface between the AAN and a controller or other device according to various embodiments of the disclosure.

Referring next to FIG. 3, a PHY module 332 is illustrated and discussed according to various embodiments of the present disclosure. Although PHY module 332 is illustrated as being configured to interface with a device incorporating a backplane, PHYs that do not include backplane interface functionality can also be used to implement the techniques described herein. Furthermore, although the illustrated PHY is described as operating on non-return to zero (NRZ) data on the system side and pulse amplitude modulated (PAM) data on the device side, in other embodiments PHY can be configured to be coupled to a reduced, twisted-pair network employing PAM data encoding on the system side, consistent with various standard GbE protocols. Furthermore, although 40 Gb data rates are discussed, the techniques for using pre-compensation parameters and the general operating principles described herein can also be applied to 1 Gb or other data rates.

PHY 332 includes an egress path 301, and ingress path 351, control test module 371, and auto negotiation and PHY configuration module ("configuration module") 373. In general operation, PHY 332 receives four lanes of non-return to zero (NRZ) data, which can be clocked at 25.78 Gb/s. The four lanes of NRZ data are received at serializer/deserializer (serdes) 303, which forms part of egress path 301. Serdes 303 performs the serializer/deserializer functions and transmits the data, still in four-lane NRZ signaling format, to the 100G data path 305, which includes 40 Gb attachment user interface (XLAUI) Rx PCS 306, 100G Tx PCS 308, FEC encoder 310, and PAM4 Tx 312. XLAUI Rx PCS 306 aligns, deskews, and descrambles the NRZ data, and serves as a retiming interface, which can change the number of lanes used to transmit the data, if needed. XLAUI Rx PCS 306 essentially decodes the NRZ data. 100G Tx PCS 308 inserts alignment blocks into the deskewed data for later use by a receiver in deskewing the data. The FEC encoder 310 applies forward error correction techniques to the data, and sends the data to PAM Tx 312, which transcodes the FEC encoded data into the 256b/257b data blocks used by PAM4.

After the data has been encoded according to the PAM4 protocol, the data is sent to Tx AFE (analog front end) 307, which can modulate the data at a rate of between about 26.5 Gbps/per lane to 27.2 Gbps/per lane and physically puts the data onto a backplane of a device. Thus, the data enters PHY 300 on the system side in an NRZ signaling format at 25.78 Gb/s, and leaves PHY 300 on the line side at between about 26.5 Gbps/per lane to 27.2 Gbps/per lane in a PAM4 format.

A similar procedure is performed, except in reverse, when PAM4 data is received on the line side of PHY 300 using ingress path 351 and converted to NRZ data for output on the system side of PHY 300. PAM 4 data is received at RX AFE 357, and sent through the 100G data path 355 for conversion to NRZ and output by serdes 353. PAM4 RX 362 decodes the data from the PAM4 format, FEC decoder 360 uses the REC information as necessary to perform error correction functions, 100G RX PCS 358 transcodes the data from 512b/514b format to the 64b/66b format, and XLAUI TX PCS 356 adds alignment blocks to the data for later deskewing and adjusts the number of lanes as needed.

Control test module 371 can be used in conjunction with configuration module 373 to perform standard or modified auto-negotiation and link acquisition procedures as described herein. For example, memory 381 can be used to store control profile 383 and link parameters/info 385. The link parameters include pre-compensation parameters, which can used in place of some or all parameters that conventional PHYs would normally determine during a conventional link acquisition process. For example, conventional systems exchange information about state transitions, transmit power settings, transition synchronization, receiver status, and precoder coefficients during the link acquisition process. The precoder coefficients for a particular channel can be pre-stored in link parameters/information 385, which is particularly useful in fixed network topology automotive area networks (AANs). Furthermore, pre-compensation parameters associated with particular mechanical and temperature conditions can be used to adjust precoder coefficients stored in memory 381. If any precoder coefficients are obtained during the link acquisition process, those precoder coefficients can likewise be adjusted or replaced using the stored pre-compensation parameters. Particular pre-compensation parameters or pre-adjusted precoder coefficients can be selected based on current measured or estimated mechanical and temperature variants.

Figure 4:
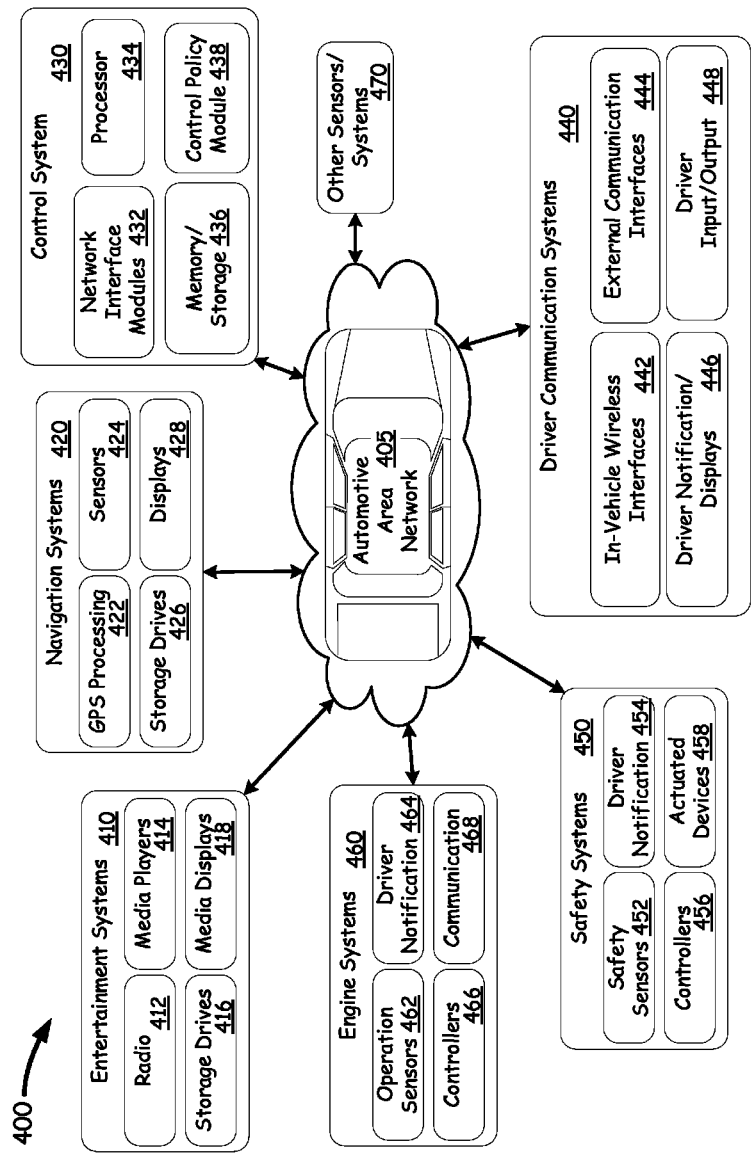
FIG. 4 is a diagram illustrating an AAN having multiple sub-systems, any or all of which can implement fast wake-up and link acquisition on a system level basis according to various embodiments of the disclosure.

Referring next to FIG. 4, a system 400 including an automotive area network (AAN) 405 is illustrated according to various embodiments of the present disclosure. Automotive area network 405 includes entertainment systems 410, navigation systems 420, controller 430, driver communication systems 440, safety systems 450, engine systems 460, and other sensor systems 470. The systems can communicate with each other, and in some cases other portions of the automobile and external systems and networks, via AAN 405, using any of various suitable communication protocols. For example, in some embodiments each of the subsystems connected to AAN 405 are capable of communicating via communication links conforming to one or more of various standards such as: IEEE 802.3ab, which describes Gigabit Ethernet; IEEE 802.3ba, which describes 40 and 100 Gb Ethernet (GbE); IEEE 802.5, which defines token ring; IEEE 802.6, which defines Fiber Distributed Data Interface (FDDI); IEEE 802.11, which describes wireless Ethernet standards; and the like. In some embodiments, the various subsystems within AAN 405 are connected to allow direct communication between subsystems, with subsystem controllers (discussed subsequently with respect to FIG. 3) handling communications within a subsystem using the same or a different protocol independent of the overall protocol used by AAN 405 for communication between subsystems. In other embodiments, subsystems and devices are connected to allow direct communication between devices or subsystems. Yet other embodiments employ various hubs, routers, gateways, or other intermediate data communication nodes to facilitate either direct or proxy type communications between devices and subsystems connected to AAN 405. In embodiments employing hubs, routers, gateways or the like, any or all of the hubs, routers, gateways can be included as separate subsystems (not illustrated), or included in any or all of the various illustrated subsystems.

Each of the various systems illustrated in FIG. 4 can provide dedicated functionality tailored to a particular purpose, or provide general functionality that can be altered based on network loading or other operational requirements. For example, entertainment system 410 can provide entertainment to passengers with the driver of the vehicle in which AAN 405 is implemented, while Navigation systems 420 can provide dedicated navigation functionality. In other embodiments, however, the display of media and navigation information can be shared between Entertainment systems 410 and Navigation systems 420, or other systems, and resources from one system can be used by another system. Note that although not specifically illustrated, the various subsystems, include network interface modules that allow the subsystems to be coupled to AAN 405.

As illustrated in FIG. 4, entertainment system 410 can include radio 412 for receiving and presenting radio broadcasts; media players 414 for playing back stored media content; storage drives 416 for storing media to be played back; and media displays 418 for outputting media obtained from radio 412, media players 414, and storage drives 416, to a driver or passenger.

Navigation system 420 includes global positioning system (GPS) processing 422; position, speed, location, and GPS sensors 424; storage drives 426, for use in storing maps, favorite locations, and the like; and displays 428 for displaying maps routes or other navigation related information.

Driver communication systems 440 can include in-vehicle wireless interfaces 442, which permit a driver and passengers to interface their personal communication devices, such as smart phones, wireless phones, laptops, personal digital assistants, or the like, to automotive area network 405. In some embodiments, in-vehicle wireless interfaces 442 also enables interfacing user devices to media displays 418, storage drives 416, media players 414, or radio 412 of entertainment systems 410. Driver communication systems 440 also includes external communication interfaces 444, which provides communications with networks external to AAN 405, such as a mobile telecommunication network or an external hotspot established either within or outside of a vehicle implementing AAN 405. External communication interfaces 444 can also include various plugs, cables, adapters, switches, or the like, used to facilitate hardwired connection of driver or passenger devices to automotive area network 405

Driver communication systems 440 also includes driver input/output modules 448, which can include microphones to permit a driver or passenger to issue verbal commands to one or more devices, buttons, switches, knobs, or various user selectable objects presented on graphical user interfaces, displayed via media displays 418 included in entertainment systems 410, displays 428 included in navigation systems 420, or displays, keypad, and the like otherwise available via AAN 405. Driver communication systems 440 also include driver notification/displays 446, which can be used in place of, or in addition to, the various other displays, inputs, and outputs available via AAN 405.

Safety systems 450 include safety sensors 452, which can include airbag sensors, speed sensors, accelerometers, positional sensors and backup cameras, or the like. Driver notification module 454, also be included in safety systems 450, can used in place of, or in addition to, other notification devices and modules included in other subsystems. Safety systems 450 also include various actuated devices 458, such as airbags, and controllers 456, such as traction control systems, adaptive steering and headlamps, cruise control, or the like.

Engine systems 460 can include operational sensors 462, such as oxygen sensors fuel sensors voltage sensors and other sensors known to those of skill in the automotive parts. Driver notification devices or modules 464 can include various lights, gages or other similar devices, and may use displays in other subsystems, for example navigation subsystem 420 displays 428, and entertainment systems 410 media displays 418, to provide notifications to vehicle occupants. Controllers 466 can include control modules used to control various engine functions, and can include a microcontroller designed to adjust engine functionality based on information provided by various sensors and vehicle subsystems. Communication module 468 can include various receivers, transmitters, communication paths, amplifiers, buffers, or the like used to facilitate communication between engine systems 460 and automotive area network 405.

Other sensors and systems 470 can include various sensors, switches, and measurement devices, for example door open/close sensors, thermostats, thermometers, resistance or conductivity sensors used to detect the failure of a headlamp, overhead light, or other illumination device, current sensors, voltage sensors, tire pressure sensors, light sensors used to activate headlights during periods of low light, and so on. Note that many of the other sensors/systems 470 can also be included in operational sensors 462.

Control system 430 can include network interface modules 432, one or more processors 434, memory/storage 436, and control policy module 438. In various embodiments, control system 430 operates to implement a control policy for AAN 405, in which a balance between performance and power usage is established for each device individually, for each subsystem individually, for devices within each subsystem as an aggregate, and/or for all subsystems as a whole.

Control policy module 438 can be used to select and implement a control policy based on a number of factors including link acquisition speed thresholds, the current operating environment of the vehicle, an operating history of the vehicle, an environmental history, a performance or power usage history of AAN 405, data types, data usage, user preferences, the type of traffic being carried within any or all particular subsystems of AAN 405, response time requirements for particular devices, or the like. Memory/storage 436 can be used to store a history of the vehicle operation, one or more control policies, pre-compensation parameters, sensor information, driver and passenger preferences, factory defaults, network configurations, and other information that can be used to allow control policy module 438 to select and implement one or more control policies based on the current conditions or operating environment of AAN 405.

Network interface modules 432 can include one or more modules used to communicate with the various subsystems or devices coupled to automotive area network 405. In some embodiments, a control policy may dictate that a standby or low power state includes a state in which the frequency and type of communications with a particular device or subsystem are limited by turning on PHY circuitry of a communications module only periodically. In other embodiments, a low power state allows power-up of the PHY, but prevents power up of some or all of the higher level circuitry of the device. When leaving a low power state, a PHY can acquire a link using pre-compensation parameters provided by control system 430 during a previous communication session. In some embodiments, each device can include at least a part of a control policy designated as a default control policy, and boots to the power state specified by the default control policy, using pre-compensation parameters previously stored in the device.

Control policy module 438 can both select and implement control policies using control processor 434 and/or circuitry included in control policy module 438. Thus, for example, if control system 430 receives information from a subsystem of AAN 405, e.g. from an operational sensor 462 included in engine systems 460 subsystem, control policy module 438 can select a different control policy than it would select under different environmental conditions as indicated by operational sensor 462.

Figure 5:
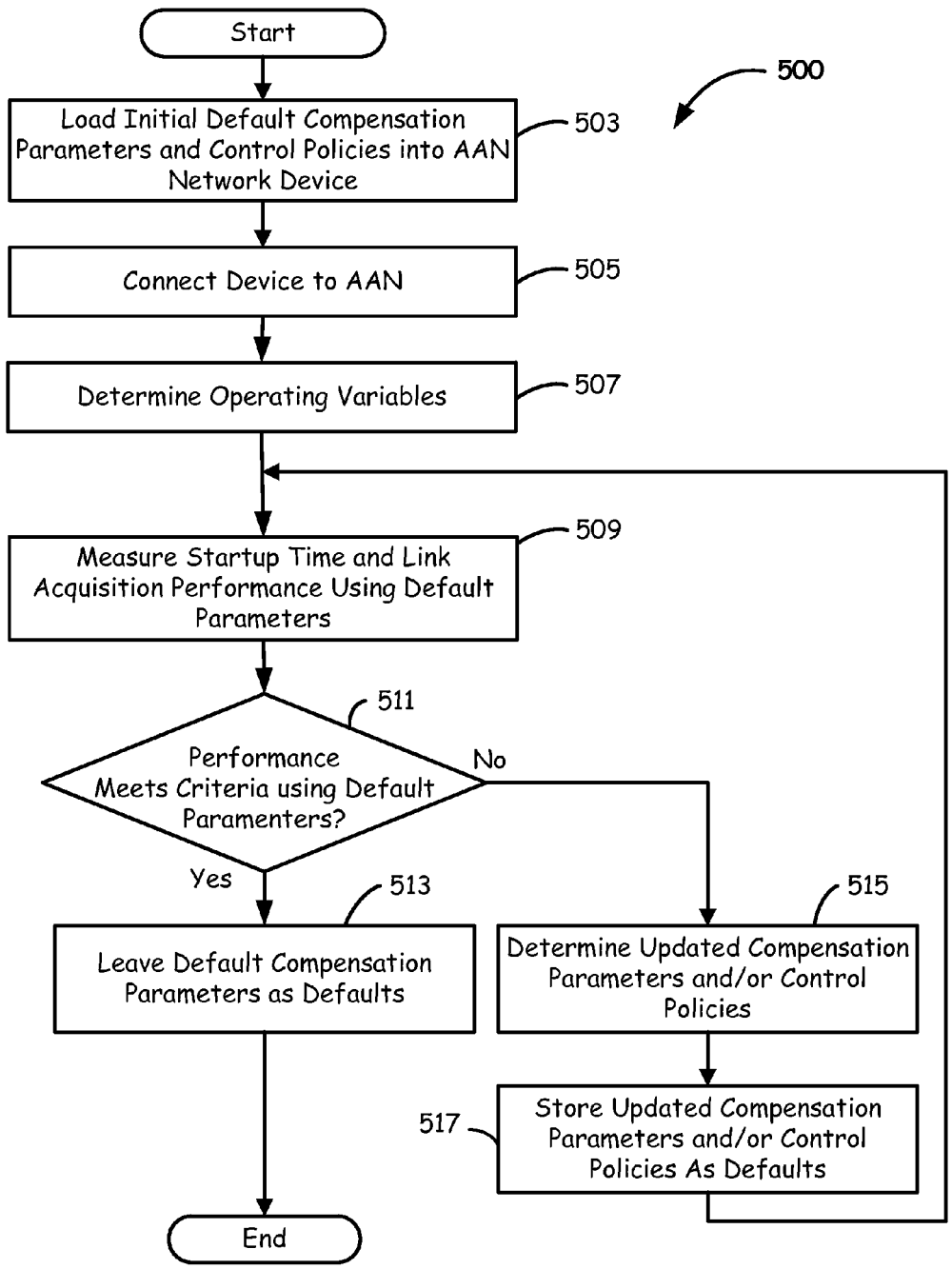
FIG. 5 is a flowchart illustrating a method of generating and storing factory default compensation parameters, according to various embodiments of the disclosure.

Referring next to FIG. 5, a method 500 illustrating a training process which can be used during a vehicle manufacturing process to determine default compensation parameters to be stored in a device connected to automotive area network ("AAN"), according to various embodiments of the disclosure. At block 503 initial, or default, pre-compensation parameters and control policies, which can be used to facilitate improved wake up and link acquisition times, are loaded into a device. Initial pre-compensation parameters can be selected, in some cases, based on manufacturing information associated with cables, wiring harnesses, or the like used to construct an AAN. For example, initial pre-compensation parameters, to be used for establishing base precoder coefficients for use in a link acquisition process, can be established for an AAN based upon the model number of a wiring harness. Thus, each device to be connected to a wiring harness associated with a particular AAN can be stored into each of the devices as a default pre-compensation parameter to use for the initial link acquisition training process performed when the device attempts to establish a communication link for the first time after being connected to the AAN at block 505.

At block 507 operating variables are determined. Operating variables can be determined by receiving information at the device from other devices or subsystems of the AAN, or based on information pre-stored in the device. These operating variables can include temperature, humidity, vibration, or the like.

At block 509, upon establishing a communications link, the time needed to establish communication with another device on the AAN can be measured, or estimated based on measurements, as well as various link or channel performance parameters. These link or channel performance parameters can include, but are not limited to, insertion loss, return loss, source clock offset, cross talk, and the like. In many instances, the training communications link is established with a controller, bridge, gateway, router, switch, or the like.

At block 511 a determination is made about whether the start up time and link acquisition performance measured or estimated during the initial link acquisition process meets performance criteria using the default parameters. If not method 500 proceeds to block 515, where updated compensation parameters or control policies are selected and then to block 517 where the updated compensation parameters and control policies are stored into the device for use during subsequent link acquisition events. In some embodiments, the compensation parameters are immediately adjusted, and additional measurements are made using the newly updated parameters.

If the link acquisition time and other link performance parameters measured at block 509 meet specified thresholds were criteria for acceptable, or optimal performance, method 500 proceeds to block 513, where the default compensation parameters currently stored in a device at block 503 are left unchanged. By leaving the default, station parameters unchanged, the same default pre-compensation parameters used in establishing a communications link previously will be used again the next time the device being configured is powered up and needs to acquire a communications link.

Figure 6:
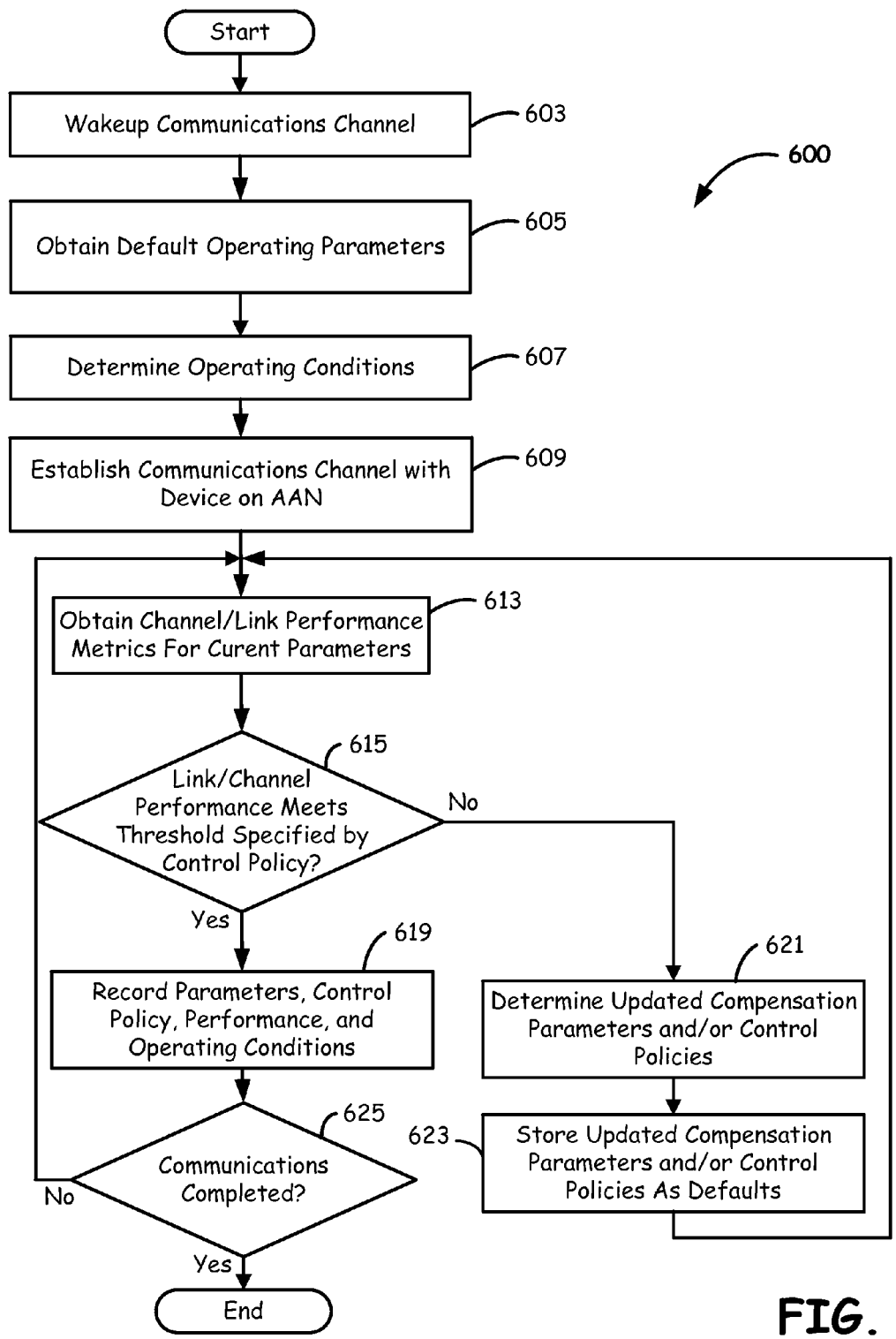
FIG. 6 is a flowchart illustrating a method of waking up and acquiring a data/communications link and updating compensation parameters during operation, according to various embodiments of the disclosure.

Referring next to FIG. 6, a method 600 illustrating waking up and acquiring a data/communications link and updating compensation parameters during operation, will be discussed according to various embodiments of the present disclosure. At block 603 a device connected to the automotive area network ("AAN") receives a wake-up command via the AAN. In some embodiments, this wake-up command includes an implementation delay, such that the device is instructed to wake-up the communication channel after a predetermined delay. In other embodiments, waking up communication channel, illustrated by block 603, can be performed at vehicle power up, device power up, upon changing from a low-power state to fully active state, or the like.

At block 605 the default operating parameters are obtained by the device. The default operating parameters are, in at least one embodiment, the same parameters established during the initial and initial training process, and can be obtained from memory local to the device. In other embodiments, the default operating parameters can be obtained from various other sources, including user input databases, or the like. The default operating parameters generally specify pre-compensation parameters that can be used to adjust the signal processing performed by the device while establishing a link.

As illustrated by block 607, the operating conditions of the AAN are determined. Part of determining the operating conditions at block 607 can include, in some embodiments, selecting certain of the default operating parameters based on a control policy or otherwise. Determining operating conditions at block 607 can also include adjusting the default operating parameters to account for various mechanical ingress, climactic, and environmental (MICE) variations.

After determining the operating conditions at block 607 a communication channel is established at block 609 between the device and another device on the AAN. In at least some embodiments, the device on the AAN with which communications are to be established is a network controller or subsystem controller. However, in other embodiments, communications can be established with any other authorized device on the AAN. For example, if the device in question is a network storage device, the communications between a network storage device can be established with a media player requesting access to information stored on a network storage device.

At block 613 after the communications channel is established, link performance metrics can be obtained, and associated with the current operating parameters used in establishing the communications channel or link. Obtaining a link performance metrics can include measuring or estimating various channel characteristics. In at least one embodiment, the current performance metrics are associated with both the operating conditions and the default operating parameters, to help establish a relationship between operating conditions, parameters, and link performance.

At block 615, a check is made to determine whether the link/channel performance metrics meet threshold specified by a control policy, preset factory thresholds, user defined thresholds, or the like. If it is determined at block 615 that the link performance is acceptable, or optimal, depending on the threshold specified by the control policy, method 600 proceeds to block 619 were a record is made of the parameters, the control policy, the performance, and operating conditions. By reporting this information, and associating each of the separate pieces of information with each other, a history can be developed. This history can be used to help set default operating parameters under similar conditions in the future, or in some cases to alter the default operating parameters. After the information is recorded at block 619, a check is made at block 625 to determine whether the communications over the link established have been completed, and if they have been completed, the method 600 proceeds to end. However, if the communications are not completed the link or channel can be continuously monitored by returning to block 613. Monitored variations in the overall channel response include, but are not limited to, frequency drift, and return loss variation as a function of temperature.

If it is determined at block 615 that performance criteria for the link or channel are not satisfying the required threshold performance metrics, updated compensation parameters and/or control policies are selected at block 621. These updated compensation parameters and control policies can be chosen based on previous link performance under particular conditions. Thus, if link or channel performance is not satisfactory, a performance history can be checked to identify compensation parameters in control policies that may be better suited to the operating conditions identified at block 607.

After determining and selecting updated compensation parameters or control policies the updated parameters and control policies can be applied and stored, as illustrated by block 623. After applying and storing the updated compensation parameters, method 600 returns to block 613, where channel/link performance metrics for the current parameters are determined.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the FIGS. Such a memory device or memory element can be included in an article of manufacture.

The present disclosure has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present disclosure may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for use in a transceiver coupled to an automotive area network (AAN) comprising a plurality of transceivers coupled via substantially fixed communication pathways, the method comprising:
   obtaining, at a first transceiver, at least one pre-compensation parameter related to a characteristic of a selected one of the plurality of substantially fixed communication pathways, wherein the at least one pre-compensation parameter includes a default pre-compensation parameter previously stored in a memory of at least one of the plurality of transceivers;
   using the at least one pre-compensation parameter to configure channel response settings of a first transceiver prior to the first transceiver acquiring a communication link via the selected one of the plurality of substantially fixed communication pathways; and
   acquiring the communication link using the channel response settings.

2. The method of claim 1, wherein:
   the at least one pre-compensation parameter comprises at least one value obtained using a channel training process.

3. The method of claim 2, further comprising:
   obtaining updated pre-compensation parameters reflecting updated characteristics of the selected one of the plurality of substantially fixed communication pathways; and
   using the updated pre-compensation parameters to reconfigure the channel response settings of the first transceiver.

4. The method of claim 1, wherein:
   the plurality of substantially fixed communication pathways comprise twisted pairs; and
   the acquiring the communication link comprises using Ethernet link acquisition protocols.

5. The method of claim 1, wherein:
   the first transceiver comprises a Reduced-twisted pair Gigabit Ethernet transceiver.

6. The method of claim 1, wherein the pre-compensation parameters compensate for mechanical, ingress, climactic, and environmental variations.

7. The method of claim 1, further comprising:
receiving a wakeup command via the selected one of the plurality of substantially fixed communication pathways; and
initiating link acquisition using the at least one pre-compensation parameter.

8. The method of claim 1, wherein the characteristic of the selected one of the plurality of substantially fixed communication pathways:
comprises a channel characteristic that varies with mechanical conditions and temperature variations; and
the channel characteristic is selected from the group consisting of: insertion loss, return loss, source clock offset, and crosstalk.

9. A system including an automotive area network (AAN) having a substantially fixed topology, the system comprising:
a first transceiver coupled to the AAN via a first substantially fixed communication pathway;
memory storing pre-compensation parameters related to characteristics of the first substantially fixed communication pathway, wherein the pre-compensation parameters include a pre-compensation parameter determined using a channel training process;
the first transceiver configured to establish first channel response settings based on the pre-compensation parameters prior to acquiring a communication link via the first substantially fixed communication pathway; and
the first transceiver further configured to acquiring the communication link using the first channel response settings.

10. The system of claim 9, further comprising:
a second transceiver coupled to the AAN via a second substantially fixed communication pathway;
the second transceiver configured to establish second channel response settings based on the pre-compensation parameters prior to acquiring a communication link via the second substantially fixed communication pathway; and
the second transceiver further configured to establish communications with the first transceiver via a communication path including the second substantially fixed communication pathway.

11. The system of claim 9, wherein:
the pre-compensation parameters comprise factory default values.

12. The system of claim 11, wherein:
the pre-compensation parameters comprise updated pre-compensation parameters determined based on channel response characteristics obtained during operation of the communication link.

13. The system of claim 9, further comprising:
a vehicular wiring harness comprising a plurality of twisted-pair conductors configured to be connected to a plurality of Ethernet receivers.

14. The system of claim 9, further comprising:
a Reduced twisted-pair Gigabit Ethernet transceiver configured to wake up from a low power state in response to a wakeup commend received via the AAN.

15. The system of claim 9, wherein the pre-compensation parameters compensate for mechanical, ingress, climactic, and environmental variations.

16. The system of claim 9, wherein the first channel response characteristics of the substantially fixed communication pathway:
comprise characteristics that vary with mechanical conditions and temperature variations; and
the first channel response characteristics are selected from the group consisting of: insertion loss, return loss, source clock offset, and crosstalk.

17. A device for use in an automotive area network (AAN) comprising a substantially fixed topology, the device comprising:
memory configured to store pre-compensation parameters related to characteristics of a substantially fixed communication pathway of the AAN;
an Ethernet transceiver configured to:
communicate via a substantially fixed communication pathway of the AAN;
establish channel response settings based on the pre-compensation parameters; and
acquiring a communication link using the channel response settings.

18. The device of claim 17, wherein the pre-compensation parameters comprise at least one of:
factory default values obtained using a channel training process; and
updated pre-compensation parameters determined based on channel response characteristics obtained during operation of the communication link.

19. The device of claim 17, further comprising:
a connector configured to mate with a vehicular wiring harness comprising a plurality of twisted-pair conductors.

20. The device of claim 17, wherein the pre-compensation parameters compensate for mechanical, ingress, climactic, and environmental variations in link performance.

* * * * *